United States Patent
Westberg et al.

(10) Patent No.: US 9,866,652 B2
(45) Date of Patent: Jan. 9, 2018

(54) METHOD, APPARATUS AND COMPUTER PROGRAM FOR PROVIDING A DATA OBJECT FROM A CONTENT SERVER TO A CLIENT DEVICE OVER A RADIO ACCESS NETWORK (RAN)

(71) Applicant: TELEFONAKTIEBOLAGET L M ERICSSON (PUBL), Stockholm (SE)

(72) Inventors: Lars Westberg, Enköping (SE); Hans Eriksson, Sollentuna (SE); Attila Mihály, Dunakeszi (HU); Gábor Molnár, Békésszentandrás (HU); Åke Arvidsson, Solna (SE); Ying Zhang, Fremont, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 202 days.

(21) Appl. No.: 14/762,735

(22) PCT Filed: Jan. 28, 2013

(86) PCT No.: PCT/EP2013/051592
§ 371 (c)(1),
(2) Date: Jul. 22, 2015

(87) PCT Pub. No.: WO2014/114361
PCT Pub. Date: Jul. 31, 2014

(65) Prior Publication Data
US 2015/0326694 A1  Nov. 12, 2015

(51) Int. Cl.
*G06F 15/16* (2006.01)
*H04L 29/06* (2006.01)
(Continued)

(52) U.S. Cl.
CPC .......... *H04L 67/42* (2013.01); *H04L 65/4084* (2013.01); *H04L 65/605* (2013.01);
(Continued)

(58) Field of Classification Search
CPC ....... H04L 67/42; H04L 67/10; H04L 65/605; H04L 65/4084; H04L 65/80;
(Continued)

(56) References Cited

U.S. PATENT DOCUMENTS 6,981,029 B1 * 12/2005 Menditto .......... H04L 29/12113
709/217
7,853,593 B2  12/2010 Serdy, Jr.
(Continued)

FOREIGN PATENT DOCUMENTS

WO  2013/170903 A1  11/2013

OTHER PUBLICATIONS

The Chromium Projects; "SPDY: An experimental protocol for a faster web;" http://www.chromium.org/spdy/spdy-whitepaper; retrieved from Internet Nov. 21, 2012.
(Continued)

*Primary Examiner* — Michael A Keller

(57) ABSTRACT

A method and apparatus for providing a data object from a Content Server to a client device over a Radio Access Network (RAN). A first property is determined that may affect the way in which the data object is to be transferred. A property of the data object is also determined. In response to the determined first property and the property of the data object, a characteristic of a transfer of the data object from the Content Server to the client device is amended. The data object is then provided from the Content Server to the client device. The method allows characteristics of the transfer of the data object to be changed to optimize transfer to the
(Continued)

client device. Examples of the first property include properties in the RAN or client device instructions.

16 Claims, 9 Drawing Sheets

(51) Int. Cl.
H04L 29/08 (2006.01)
H04W 4/18 (2009.01)
H04W 4/04 (2009.01)
H04W 80/12 (2009.01)

(52) U.S. Cl.
CPC .............. *H04L 65/80* (2013.01); *H04L 67/02* (2013.01); *H04L 67/10* (2013.01); *H04L 67/2823* (2013.01); *H04W 4/18* (2013.01); *H04W 4/046* (2013.01); *H04W 80/12* (2013.01)

(58) Field of Classification Search
CPC ...... H04L 67/2823; H04L 67/02; H04W 4/18; H04W 4/046; H04W 80/12
See application file for complete search history.

(56) References Cited

U.S. PATENT DOCUMENTS

| 8,181,107 B2 | 5/2012 | Melnyk | |
|---|---|---|---|
| 2004/0215665 A1 | 10/2004 | Edgar | |
| 2005/0033850 A1* | 2/2005 | Kirkland | H04L 29/06027 709/228 |
| 2006/0271642 A1 | 11/2006 | Stavrakos | |
| 2010/0195602 A1 | 8/2010 | Kovvali | |
| 2011/0010607 A1 | 1/2011 | Raveendran | |
| 2011/0167170 A1* | 7/2011 | Kovvali | H04W 28/06 709/232 |
| 2012/0113893 A1 | 5/2012 | Damola | |
| 2013/0318037 A1* | 11/2013 | Shan | G06F 17/30286 707/609 |

OTHER PUBLICATIONS

Ameigeiras, Pablo, et al., "QoE oriented cross-layer design of a resource allocation algorithm in beyond 3G systems," Computer Communications 33, pp. 571-582, Oct. 31, 2009.

* cited by examiner

METHOD, APPARATUS AND COMPUTER PROGRAM FOR PROVIDING A DATA OBJECT FROM A CONTENT SERVER TO A CLIENT DEVICE OVER A RADIO ACCESS NETWORK (RAN)

This application is a 371 of International Application PCT/EP2013/051592, filed Jan. 28, 2013, the disclosure of which is fully incorporated herein by reference.

TECHNICAL FIELD

The invention relates to the field of providing data objects to client devices.

BACKGROUND

When a user accesses web content such as text, images, video and so on using an Internet web portal, the main criterion on which they judge their perceived Quality of Experience (QoE) of the web content is the time it takes to download a web page. If the time is long, then the user will perceive a low QoE; if the time is short then the user will perceive a high QoE. If the user experiences long download-times, then the web portal used to obtain the web content will not attract as many end-users as it could, and so may generate less income from advertisements. Furthermore, the Internet service will be perceived as slow and other service providers may be chosen which leads to a higher churn for the operator.

Fluctuations in throughput from a web portal may be caused by many different factors. Examples of such factors include:

- Establishment of new sessions. In this case, the total capacity is shared among all simultaneous sessions, which in turn fluctuates as end-users request content in parallel in an unsystematic way.
- Air-interface fluctuations. The throughput to a specific user over a radio interface depends on the interference and the channel quality. The radio interface has an overall power limit which means that the energy required to send a bit to the user will generate a varying Transmission Control Protocol (TCP)-throughput.

For current networks, all data object download are performed in parallel such that they compete with each other for radio capacity which results in a bad user experience when network load is high.

There are a number of techniques that attempt to improve the download speed from web portals. One well-known technique applied at servers (acting as web portals) is to provide different versions of some or all pieces of content. For example, special versions of the data may be adapted to low resolution terminals such as smartphones. In this case, the web portal recognizes that the client device accessing the data is a mobile terminal and uses different content accordingly. This is typically achieved by using the letter "m" (or the word "mobile" in English or in a local language) as the first label of the domain name, for example m.portal.com. Servers may redirect requests from other domain names to this domain name (i.e., from www.portal.com to m.portal-.com) depending on the user agent information (e.g., terminal, browser and OS) in web request headers. Content adapted for smaller displays such as those on smartphones will also be reduced in size resulting in shorter download times under given cellular load conditions.

Another technique that involves some kind of content adaptation is based on parsing html/text files and/or checking the content to be served at the mobile operator side, and then either removing or correcting non-relevant or wrong data in the mark-up language (e.g., comments, scripts), replacing the URL of some references to content that are stored in local caches, and/or optimizing images embedded into HTML pages for mobile displays. This type of technique is described in U.S. Pat. No. 7,853,593, US 2012/0113893, US 2004/0215665 and U.S. Pat. No. 8,181,107.

Another simple, non-intrusive solution is content compression and transfer of compressed content through the air interface. The web browser at the client device can then decompress the compressed content.

An alternative way to improve the download time is to improve the utilization of wireless links which otherwise tend to be reduced as a result of the longer round trip times in wireless networks. A web client may initiate multiple parallel TCP connections to download different pieces of content. The HTTP 1.1 standard provides some optimization along these lines through the HTTP pipelining feature, which allows multiple requests to be sent through a shared TCP connection. This feature is, however, difficult and is therefore not widely implemented in current web browsers.

A further approach to reduce download times is to pre-fetch content

The main idea of another recent technique is to pre-fetch (or push) a larger amount of (possibly compressed) content to a browser at the client device, typically in a single TCP connection to avoid the impact of TCP slow-start for small data volumes. Examples of such this technique are found in US 2006/0271642 and "SPDY: An experimental protocol for a faster web", http://www.chromium.org/spdy/spdy-whitepaper/.

A further proposed technique is to control the radio resources and to share the radio resources in a latency optimized way, as described in "QoE oriented cross-layer design of a resource allocation algorithm in beyond 3G systems", Pablo Ameigeiras, Juan J. Ramos-Munoz, Jorge Navarro-Ortiz, Preben Mogensen and Juan M. Lopez-Soler, Computer Communications Volume 33, Issue 5, 15 Mar. 2010, Pages 571-582. Resources in the air-interface are divided unevenly with more resources to web pages that would otherwise suffer from long download times and therefore provide bad user experience.

The common deficiency of all current solutions is that they result in very unpredictable download times and, in many cases, the result is either download times that are too long for an adequate QoE for many web pages, or pages which are truncated, even if there would have been sufficient capacity for the original content. The non-intrusive solutions are not able to reduce download times sufficiently during high load conditions, and the intrusive solutions perform quality-degrading modifications in low-load scenarios even if the network capacity is such that the original content could have been used. If the intrusive solutions are set to moderate/low content modification, the modifications may be too small during high load conditions.

The existing solutions cannot guarantee aggregate (cell-level) QoE optimization of web downloads over all load conditions.

SUMMARY

It is an object to provide a technique for providing a data object to a client device that does not react if the desired QoE is fulfilled, does not alter the content if user experience may be satisfied by other, non-intrusive methods.

According to a first aspect, there is provided a method of providing a data object from a Content Server to a client device over a Radio Access Network (RAN). A first property is determined that may affect the way in which the data object is to be transferred. A property of the data object is also determined. In response to the determined first property and the property of the data object, a characteristic of a transfer of the data object from the Content Server to the client device is amended. The data object is then provided from the Content Server to the client device. The method has the advantage that the characteristics of the transfer of the data object can be changed to optimize transfer to the client device.

Optional examples of the determined first property include any of a property of the RAN and an instruction received from the client device.

The determined property of the RAN optionally comprises any of a RAN type, an available power in a RAN cell, a downlink code-tree consumption, a measure of congestion, a Channel Quality Indicator, power consumption of sending per bit or byte over the radio path, bearer priority, and RAN cell load. These have the advantage of optimizing transfer of the data object depending on conditions of the RAN.

As an option, the determined property of the data object comprises any of a number of associated data objects, a size of the data object, a number of sources of the data object, a data object type, and a data object priority.

As a further option, the method further comprises determining a property of the Content Server and, in response to the determined property of the Content Server, further amending the characteristic of a transfer of the data object from the Content Server to the client device. This has the advantage of optimizing transfer of the data object depending on conditions at the Content Sever.

Exemplary properties of the Content Server include any of Content Server availability, Content Server response times, and Content Server load.

As a further option, the method includes estimating a time to provide the data object to the client device and, in the event that the estimated time exceeds a predetermined threshold time, amending the characteristic of transfer.

There are many different transfer characteristics that can be amended, some of which are non-intrusive (do not change the data object itself) and some of which are intrusive (require a change to the data object). Optional examples of transfer characteristics that can be amended include amending an order in which the data object is sent relative to another data object; re-encoding a data object to reduce its size; selecting an alternative data object; deleting at least a portion of content of the data object; and cancelling the transfer of the data object. In the case where an alternative data object is selected, this may optionally include any of selecting as the alternative data object a link to the data object, selecting as the alternative data object a lower resolution version of the data object, selecting a still-image instead of a video, selecting as the alternative data object a data object having an alternative format.

The method optionally includes determining any of a property of a user subscription, a subscription policies associated with the client device, and a policy associated with the data object and, in response to the determined property of the user subscription and subscription policies associated with the client device, further amending the characteristic of a transfer of the data object from the Content Server to the client device. This advantageously allows a user or content provider to have some control over how a transfer characteristic is amended.

As an option, the method further includes, at the start of providing the data object to the client device, starting a timer and, in the event that the time recorded by the timer exceeds a predetermined threshold, amending a characteristic of a transfer of the data object from the Content Server to the client device.

According to a second aspect, there is provided a node for use in a communications network. The node is provided with a first processor for determining a first property, a second processor for determining a property of a data object to be sent from a Content Server to a client device via a RAN, and a third processor for, in response to the determined first property and the property of the data object, amending a characteristic of a transfer of the data object from the Content Server to the client device. The third processor is for further arranged to arrange the transfer of the data object from the Content Server to the client device.

As an option, the determined first property comprises any of a property of the RAN and an instruction received from the client device.

The node optionally is provided with a fourth processor for determining a property of the Content Server, and the third processor is further arranged to, in response to the determined property of the Content Server, further amend the characteristic of a transfer of the data object from the Content Server to the client device.

As an option, the node is further provided with a fifth processor for estimating a time to provide the data object to the client device, the third processor is further arranged to amend the characteristic of transfer in the event that the estimated time exceeds a predetermined threshold time.

The node is optionally provided with a sixth processor for determining a property of a user subscription associated with the client device, and the third processor is further arranged to amend the characteristic of transfer in response to the determined property of the user subscription associated with the client device.

As an option, the node is provided with a timer arranged to record a time from the start of providing the data object to the client device, and the third processor is arranged to, in the event that the time recorded by the timer exceeds a predetermined threshold, amend a characteristic of a transfer of the data object from the Content Server to the client device.

Optional examples of the node include the client device, the Content Server, and a node in the RAN.

According to a third aspect, there is provided a computer program comprising computer readable code which, when run from a computer readable medium in the form of a memory in a processor at a node, causes the node to perform the method described above in the first aspect.

According to a fourth aspect, there is provided a computer program product comprising a computer readable medium and a computer program as described above in the third aspect, wherein the computer program is stored on the computer readable medium.

According to a fifth aspect, there is provided a method as described above in the first aspect, when operated on a vessel or vehicle.

According to a sixth aspect, there is provided a node as described above in the second aspect, when applied to a vessel or vehicle.

DETAILED DESCRIPTION

In an embodiment, a property of the Radio Access Network (RAN) is found that can be mapped to, for example, an available bandwidth value for a given bearer. This is used to determine optimal QoE for different data objects to be sent from a web portal. Based on the received RAN property, the transfer of different data objects (or pieces of web content) to a certain client device may change. These changes may be non-intrusive, such as changing the order in which different data objects are transferred. Alternatively or additionally, they may be intrusive, such as removing, modifying or replacing data objects. Certain conditions may result in modifying the parameters for the given pipe related to, e.g. radio bearers or TCP connections.

Figure 1:
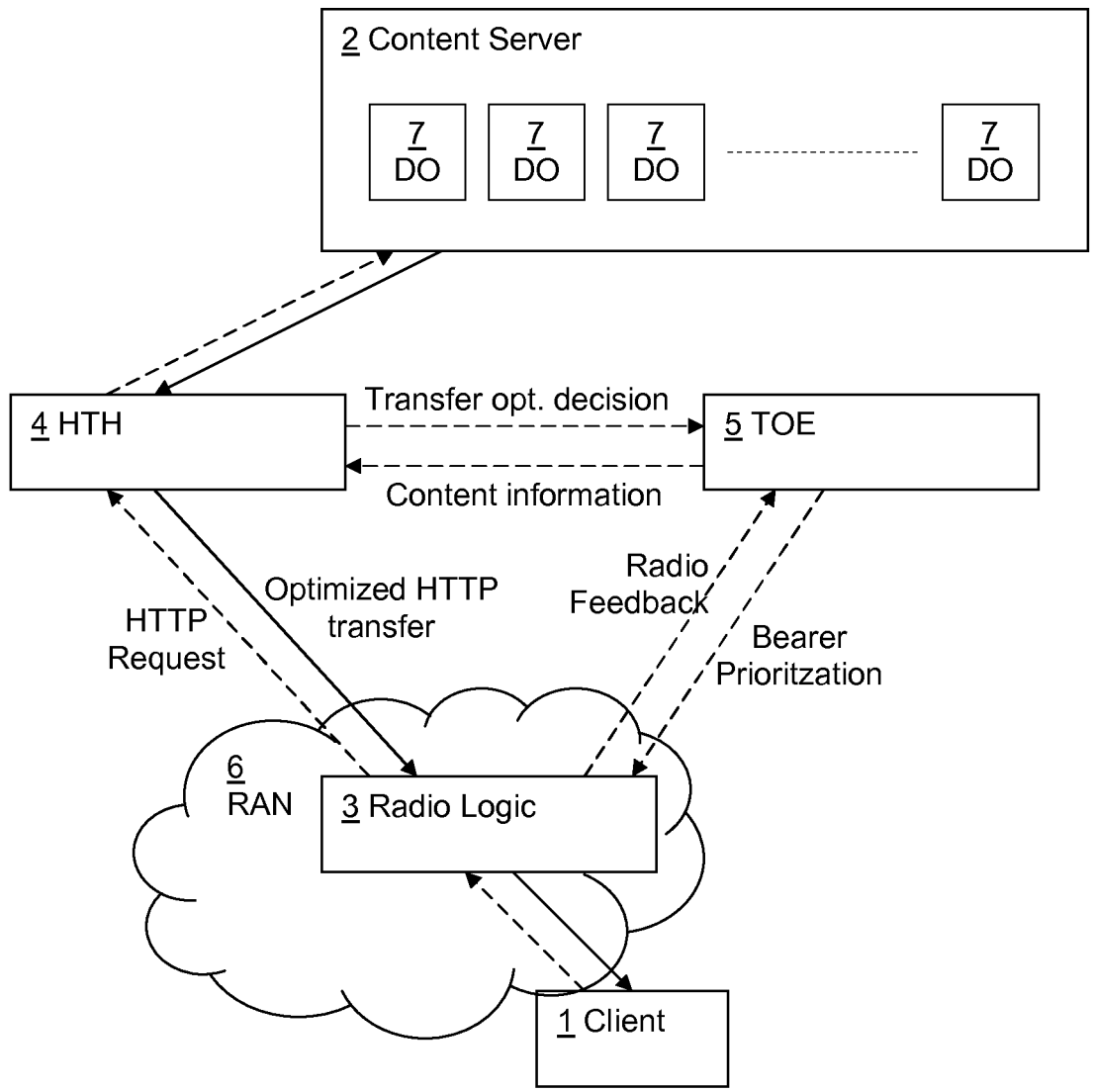
FIG. 1 illustrates schematically in a block diagram an exemplary network architecture.

FIG. 1 illustrates the functionality in which a client device 1 obtains web content from a Content Server 2. Radio logic 3 in the RAN 6 forwards a request from the client device 1 to the Content Server 2 via an HTTP Traffic Handler (HTH) 4. A Transfer Optimization Engine (TOE) 5 takes transfer optimization decisions based on factors such as properties of a data object 7 or data objects requested from the Content Server, properties of the RAN 6 or instructions from the client device 1. The properties and/or instructions are used to amend transfer characteristics of the data object 7 or data objects, such as the order in which they are sent, sending alternative data objects and so on, as described in more detail below. Note that the HTH 4 and TOE 5 functions described above could be implemented in a single node or in several nodes. For example, the HTH 4 may be located at an HTTP proxy node.

The following functionality is required:

Data object identification: In order to make sensible decisions about amending transfer characteristics of a data object, the composition of web pages, i.e., number, type and volume of involved data objects must be known.

Optimized transfer decision: This may be based on the received RAN properties, data object characteristics, server characteristics (such as server load) and so on.

Optimized transfer: The way in which the data object is to be transferred may be amended to optimize the transfer. In the first instance, it may be preferred to apply non-intrusive solutions such as changing the order in which data objects are transferred to client devices 1 depending on RAN 6 bandwidth. For example, some data objects may be very slow to access and could, for example, be pre-fetched when the first part of a web page is requested. An additional approach, which may be required in heavy congestion in the RAN 6, is to apply intrusive methods such as instant selection within a set of data objects having different sizes, selection of alternative data objects (such as replacing video with an image, or a hyperlink), reduction of the size of data objects by, for example, applying harder compression of images or replacing some objects with alternate texts which are clickable links, reduction of the number of data objects to be sent by simply eliminating some data objects from the transfer entirely, and replacing the data object with a link such that the end-user of the client device 1 later can select the data object to download.

Note that these methods may apply to both new transfers and transfers in progress.

Note also that QoE may be improved by prioritized transfer from the RAN 6 for those data objects 7 which benefit the most from fast downloads depending on factors such as the page, the file type, remaining work (unsent bytes), invested work (sent bytes), or elapsed time (the three last points refer to cases were it may be preferred to give priority to requests which are almost completed, requests for which a lot of data has already been transferred, and requests for which there is a high risk of abandonment.)

Figure 2:
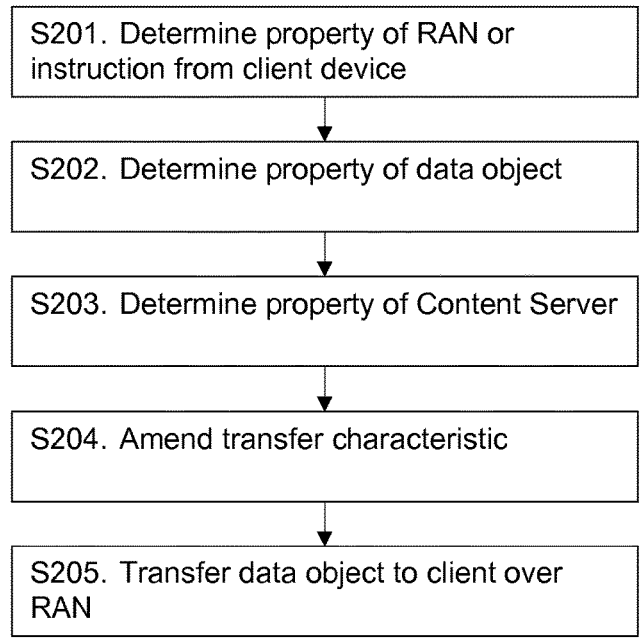
FIG. 2 is a flow diagram illustrating exemplary method steps.

FIG. 2 shows exemplary steps, with the following numbering corresponding to that of FIG. 2:

S201. A property of the RAN 6 is determined, such as congestion, available bandwidth and so on. Alternatively, the client device 1 may provide an instruction on how data objects 7 should be transferred.

S202. A property of the data object 7 (or several data objects) is determined. This may be, for example, content type, data object size and so on, as described in more detail below.

S203. In an optional embodiment, a property of the Content Server 2 is determined. This may be, for example, the current load on the Content Server 2 that may affect how quickly the Content Server can process requests.

S204. A transfer characteristic of the data object 7 is amended as a result of the determined properties. This may include, for example, the order in which data objects 7 are sent, replacing data objects with alternative data objects and so on, as described in more detail below.

S205. The data object 7 (or plurality of data objects 7) is sent to the client device 1 over the RAN 6.

Figure 3:
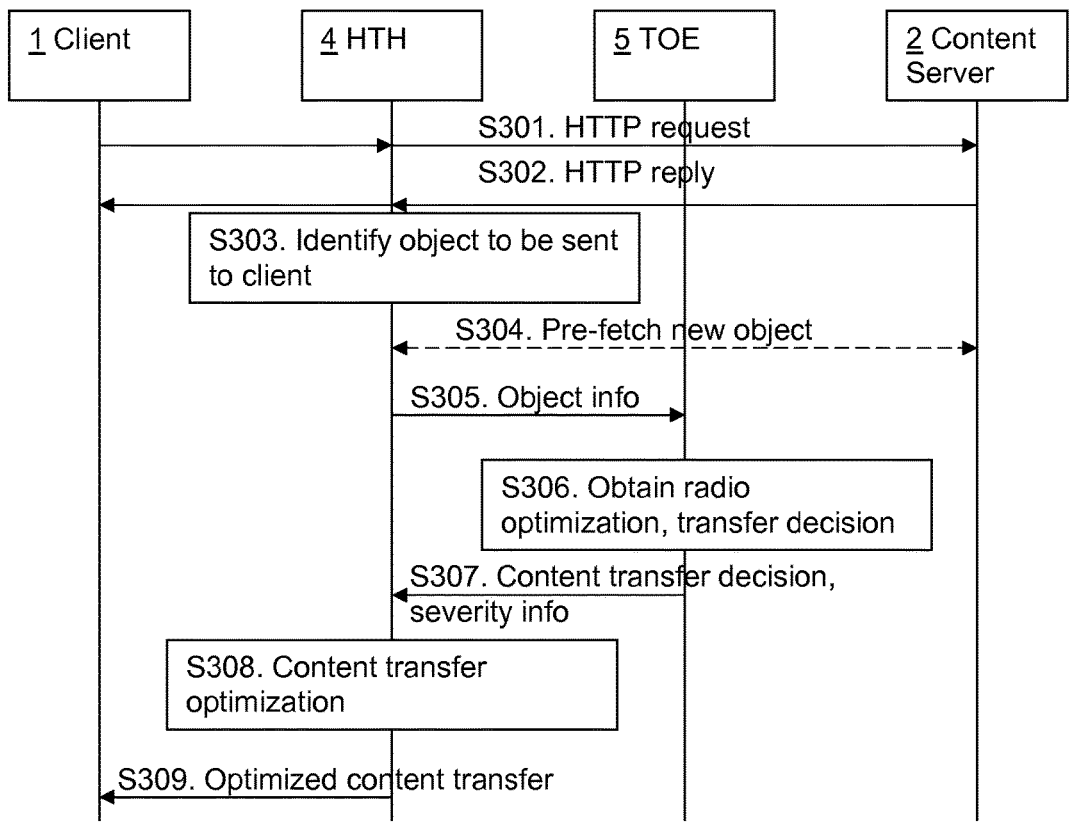
FIG. 3 is a signalling diagram showing exemplary method steps.

Turning now to FIG. 3, signalling for an exemplary page download sequence is shown. The HTH 4 is responsible for the object transfer towards the client device 1 including various methods for optimized object handling, and the TOE 5 takes the transfer optimization decisions based on data object information and other information such as RAN 6 properties, Content Server 2 properties and so on described above. The TOE 5 can optimize the transfer pipe (bearer and TCP). The following numbering corresponds to that of FIG. 3:

S301. The client device 1 requests towards the Content Server 2 to download a web page that includes a number of data objects 7.

S302. The Content Server 2 sends an HTTP reply towards the client device 1.

S303. The HTH 4 identifies the different data objects 7 that make up the page, and which eventually will be requested by and delivered to the client device 1.

S304. If there are one or more data objects 7 that are not available at the HTH 4, these are requested from the Content Server (2) in question and analyzed. Note that data objects may be located at different Content Servers 2, and only one Content Server is shown.

S305. The HTH 4 extracts metadata such as characteristics of the data object 7 and forwards this information to the TOE 5.

S306. The TOE 5 analyzes the metadata and, based on any of the properties of the RAN 6, client device 1 instructions, properties of the Content Server 2 and so one, makes a transfer optimization decision by, for example, comparing estimates of the throughput and completion time (based on the load on radio resources such as power and codes) to the appropriate QoE requirements.

S307. The content transfer optimization decision and QoE degradation severity information for the given transfer are sent back to the HTH 4 from the TOE 5.

S308. The transfer optimization process takes place in the HTH 4, based on, for example, identification of data object 7 priority.

S309. The data object 7 is transferred to the client device 1 in an optimized way. Note that during the transfer, load conditions may change. This may give rise to a change in the decision on transfer optimization. In this case the sequence is repeated from step S307.

As mentioned above, one trigger to optimize transfer of the data object 7 is a property of the RAN 6. The RAN 6 information is mainly needed to estimate the access delay and available bandwidth for given client devices 1/bearers. Examples of RAN 6 properties that may be determined are:

Access type (e.g., Wi-Fi, LTE, HSPA, 3G, EGDE) which influences the transfer time through their respective transfer delays.

Transmitted power in the RAN 6 cell, which is a measure of the overall cell utilization.

Downlink channel code tree consumption, which is another measure of the overall cell utilization.

Radio Link Control (RLC) rate, which also is a measure of the congestion that includes potential bottlenecks in the backhaul network.

Channel Quality Indicator (CQI), which is a measure of the characteristics of the radio channel and gives an indication of the required power.

Bearer priority, which determines relative priority to access cell resources.

Even less detailed RAN 6 properties may be used, such as overall cell load information e.g., a percentage of utilized power, binary high/low load states or indications to reduce throughput. Furthermore, even the type of RAN 6 technology may give an indication of the likely available bandwidth.

A property of data object 7 or objects is also used to determine data object transfer optimization. Examples of such properties include:

The number of embedded data objects 7 in a web page. All data objects 7 require explicit requests and in some cases distinct TCP connections, which may increase response times, and multiple parallel transfers may decrease response times.

The size of the embedded data objects 7 (larger objects take a longer time to download).

The number of sources (e.g., the number of n-level URLs) for the embedded data 7 objects (distinct URLs may require distinct TCP connections which may increase response times, and again multiple parallel transfers may decrease response times).

The type of data object 7. For example, if a data object is an advert it may be accorded a lower priority then text from the web page.

The above information can also be combined in different ways to compute, e.g., the total amount of data requested etc.

In some embodiments, Content Server 2 property information may be used to determine data object 7 transfer optimization. Examples of such properties include:

Information about Content Server 2 availability (it may be known that some Content Servers 2 cannot respond due to, for example, a failure).

Statistics about response times (Content Server 2 response times may be long for static reasons such as long Round Trip Times (RTTs) or temporary reasons such as load peaks).

Figure 4:
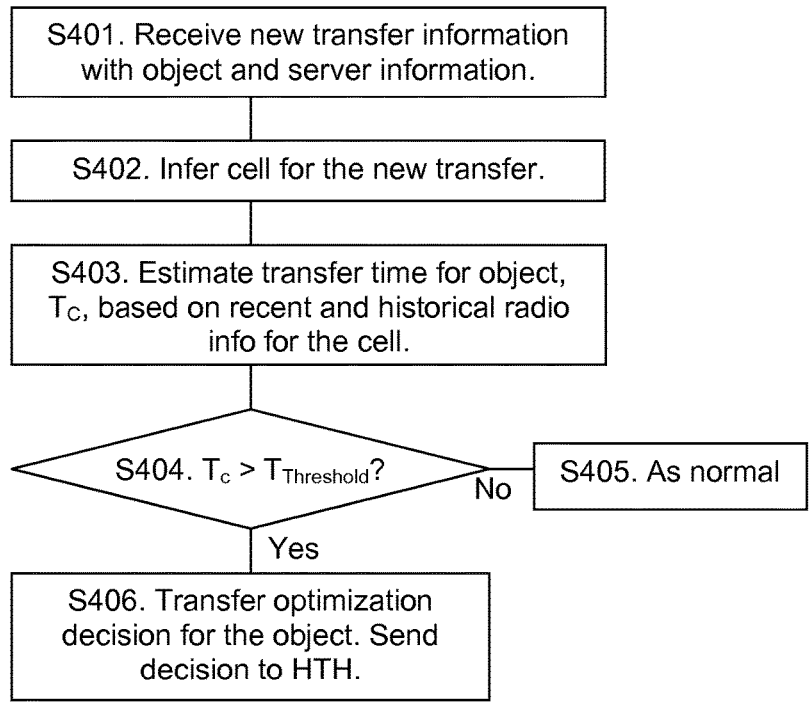
FIG. 4 is a flow diagram showing exemplary steps in prioritizing a data object.

Taken together, the information about the RAN 6, the data object 7 and the Content Server 2 (or servers) make it possible to predict the time to transfer a web page and the data objects 7 that it contains. If the predicting time is too long to satisfy QoE expectations, a decision may be made to optimize the transfer of one or more of the data objects 7. This is illustrated in FIG. 4, with the following numbering corresponding to that of FIG. 4.

S401. New transfer information is received identifying a data object 7 and the Content Server 2 from which it is to be obtained.

S402. The cell in the RAN 6 over which the data object 7 will be transferred is determined.

S403. A time, $T_c$, to transfer the data object 7 is estimated. This may be based on recent and historical information for that cell in the RAN 6.

S404. A decision is made whether $T_c$ is greater than a threshold time over which QoE expectations will not be met. If not then the method proceeds at step S405, if so then the method proceeds at step S406.

S405. The transfer of the data object 7 continues as normal with no transfer optimization.

S406. A transfer optimization decision is made by the TOE 5 and communicated to the HTH 4.

Figure 5:
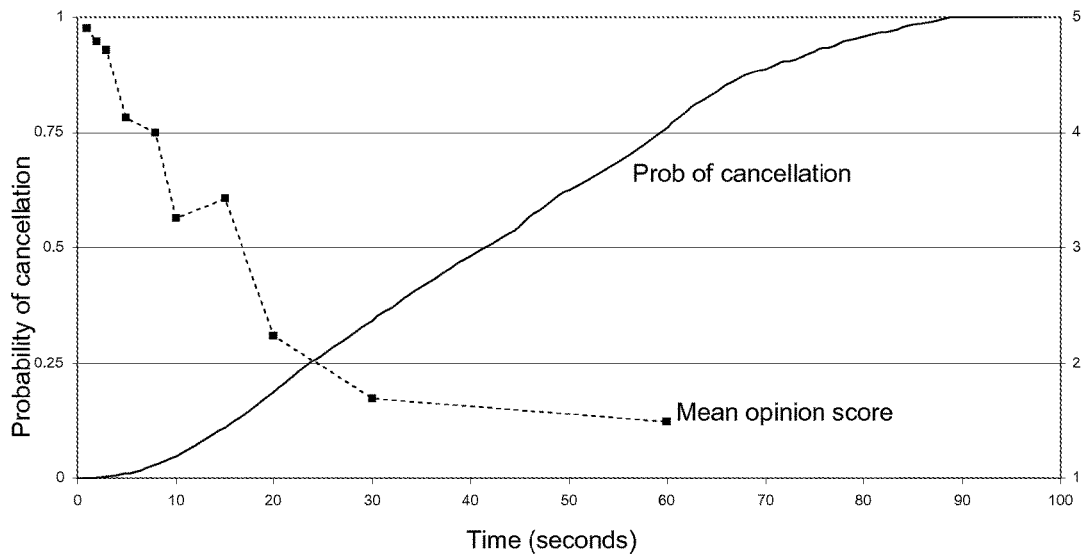
FIG. 5 is a graph showing probability of user cancellation as a function of download time.

In order to set a suitable threshold time, a graph such as that shown in FIG. 5 can be used. This shows the probability that a user will cancel a session as a function of the time taken to show the requested web page, and a mean opinion score (MOS) based on the user's subjective experience as a function of the time taken to show the web page.

The probability that a user will run out of patience and cancel the download of the web page are based on packet traces recorded in a cellular network from which web pages have been assembled and analyzed with respect to their mode of termination. The MOS values have been obtained by a study.

The optimization decision may include a bearer prioritization decision depending on, for example, the length of the estimated (remaining) transfer time, i.e., how severe QoE degradation may be expected.

Where a data object 7 transfer is to be amended in a non-obtrusive way (in other words, by not modifying the data object), it can be prioritized relative to other data objects 7. Data objects 7 are assigned a priority and transferred in the order of priority.

Figure 6:
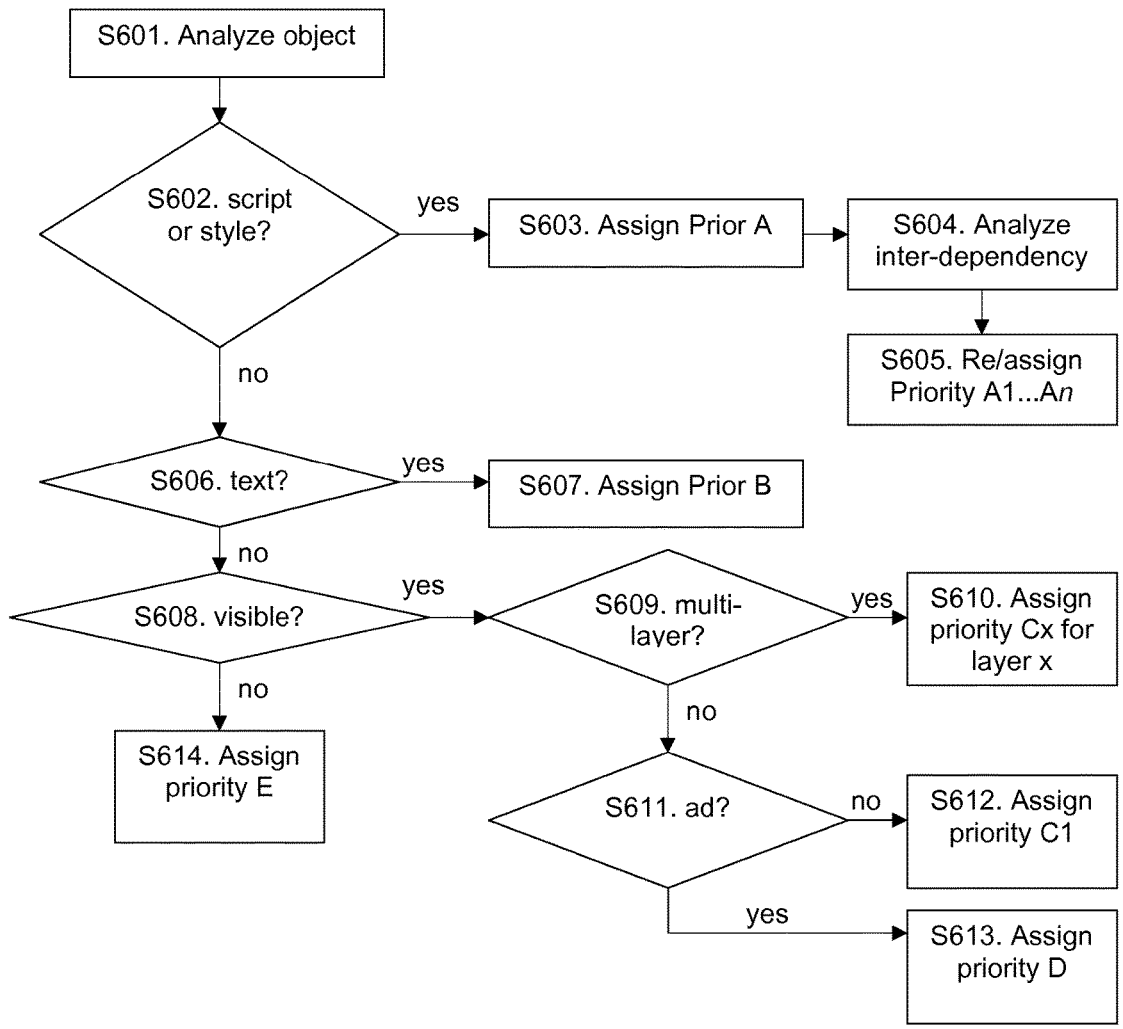
FIG. 6 is a flow diagram showing exemplary prioritization of a data object.

FIG. 6 shows an exemplary way of prioritizing a data object. The most important criterion for data object 7 prioritization is the content type since some types of content may be more important than others. The following numbering corresponds to that of FIG. 6:

S601. A data object 7 is analyzed.

S602. If the data object is a java script or style, then the process continues at step S603, otherwise the process continues at S606. Java script (inferred from suffixes such as js, jsp or similar) files should be accorded the highest transfer priority because they have to be processed before page rendering could take place. Style files (inferred from suffix css) determine the ordering of other objects on the page. They are accorded the same priority as scripts because scripts may query styles, so there is not always a strict priority of scripts over style files.

S603. The data object is assigned highest priority (in this case, priority A).

S604. The inter-dependency of java files and scripts is analyzed. The relative priority between the different java script files should by default follow the order in the html file because dependency relations are built on the standard which specifies in-order processing by clients. As mentioned above, a script may query a style. In an advanced implementation with Shadow Browsers (SBs) at a proxy, it is possible that SBs set up dependency trees (based on their observations when processing the web pages) and then sets the priorities for the different java script files according to this information rather than following the order of appearance in the page. This makes it possible to use the same priority for certain java script files and thus allows for fewer priority values. The dependencies of the data object 7 are therefore analysed.

S605. The priority of the data object 7 relative to other data objects of the same priority is reassigned depending on the dependencies of the java script and style files.

S606. If the data object 7 is a text object then the process continues at step S607, otherwise it continues at step S608. Text objects (inferred e.g., from MIME-type of the reply) have higher priority than other objects (video, picture, etc.) since, firstly, they are relatively small and, secondly, they allow users to "consume" pages before or without complete download.

S607. The data object 7 is accorded priority B.

S608. If the data object 7 is visible then the process continues at step S609, otherwise it continues at step S614. A visible data object 7 is one that is placed in the visible area of the web browser. For some web pages, there are specific java script files that infer the visible content and manipulate downloads accordingly. In this case, no additional action is needed. In the case when there is no such file, the SBs may be used to learn which data objects 7 are in the visible area of the browser and then assign a different priority to them.

S609-S613. In an optional embodiment, more than one priority is assigned for certain content, i.e., different priority levels for the different parts of the content, based on their relative importance. This may apply to, e.g., pictures and video where a certain part of the data object (e.g., the basic layer of a progressive jpeg picture of an adaptive video stream) has higher priority than the others (e.g., the higher resolution layers). The transfer of these data objects 7 then may change dynamically depending on how much of the data object 7 has been sent. Next in the priority order are those objects that may be very slow to access and may be fetched while the rest of the visible web page is displayed, e.g., advertisements objects which may be identified based on e.g., URLs.

S614. Data objects that are not on the visible area of the browser, and do not impede page rendering, are assigned the lowest priority (in this example, E). Such objects may be identified by the help of shadow browsers.

It will be appreciated that the above is only one exemplary way of according priority to data objects, and many other schemes can be envisaged.

Figure 7:
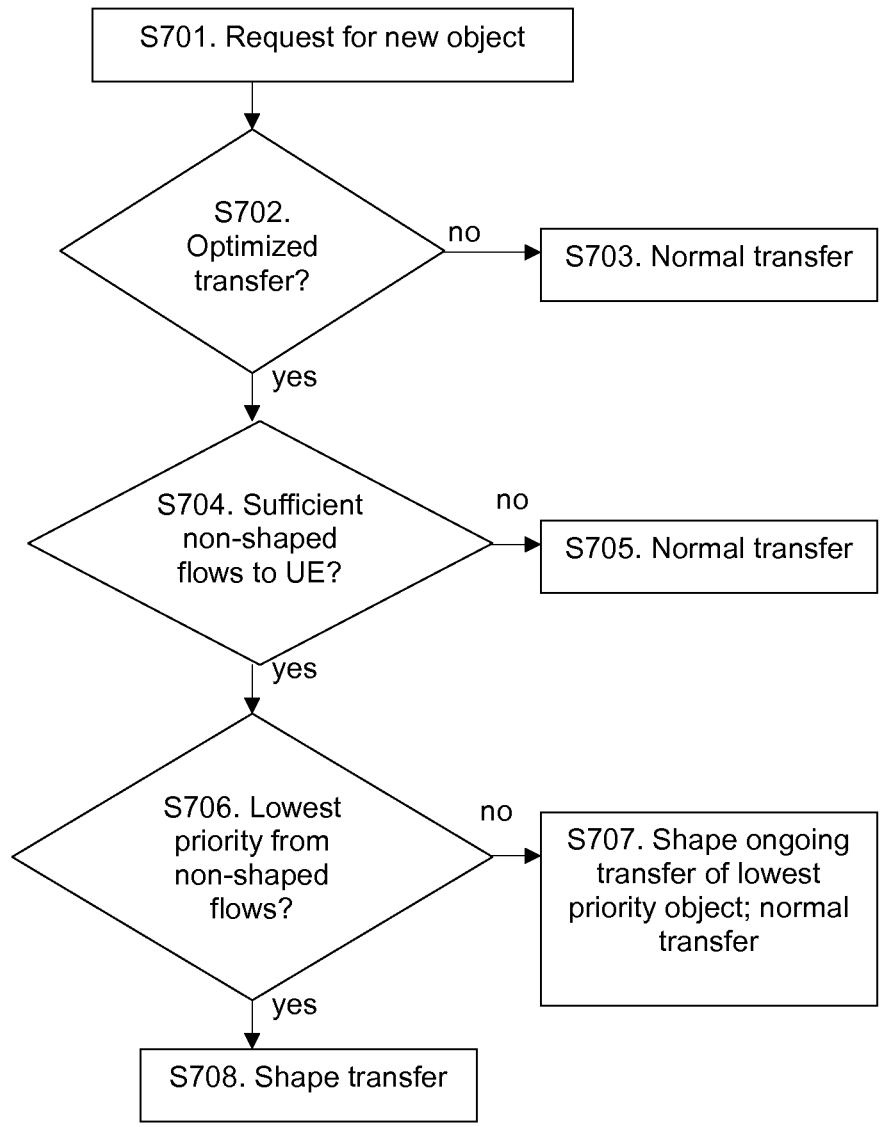
FIG. 7 is a flow diagram showing exemplary content transfer based on object priority.

Note also that data object 7 transfer prioritization may be accomplished in different ways, depending on whether there is a tunnel between the client device 1 and proxy or not. Without a tunnel, different data objects 7 are requested in different TCP sessions, and so one possible action is to shape flows of lower priority until higher priorities dominate the transfer. Care should be taken, however, to ensure that there are enough non-shaped TCP flows to all client devices 1 such that the available capacity is fully utilized. The number of simultaneous (non-shaped) TCP flows may be set dynamically according to the received RAN 6 properties. An exemplary technique for shaping flow is shown in steps S701 to S708 of FIG. 7.

In the case when all transfer towards a client device 1 is transferred in a tunnel (e.g., a SPDY tunnel) representing a single flow, then the problem above related to short TCP connections does not appear because all data is tunnelled using the same TCP-connection. Thus, the prioritization in this case may be achieved by feeding the given TCP connection always with data having the highest priority.

Note that it is thus preferred to have as many data objects 7 available at the HTH 4 at the start of the transfer as possible to avoid situations where high-priority data objects 7 will have to wait until they have been fetched to the prioritization logic. Such pre-storage can be accomplished by a data object 7 identification and pre-fetch function.

When a data object 7 transfer is amended in an intrusive way, the data object may be changed in some way. The main concept is to speed up the transfer of the data object 7 by reducing the number of bytes, objects and/or URLs.

In case of heavy load in the RAN 6, re-ordering the sending of data objects 7 may not be sufficient to make the QoE acceptable. In this case the content of the data object 7 may need to be changed. Exemplary options for data object 7 modifications and/or selection include:

Re-encoding. Pictures and videos may, e.g., be re-encoded at a poorer resolution.

Selection between different object types: image, animated image and video. For example, it may be possible to replace certain video content with just an image if there is a shortage of resources in the RAN 6. An animated image (e.g. GIF file) may be similarly replaced with a non-animated image.

Re-encoding and reselection can be done on-the-fly or prepared in advance (at least for relatively popular objects). In the latter case, several versions can be prepared and known in advance such that HTH 4 will be able to present the TOE 5 with several options, as shown in step S305 in FIG. 3.

Figure 8:
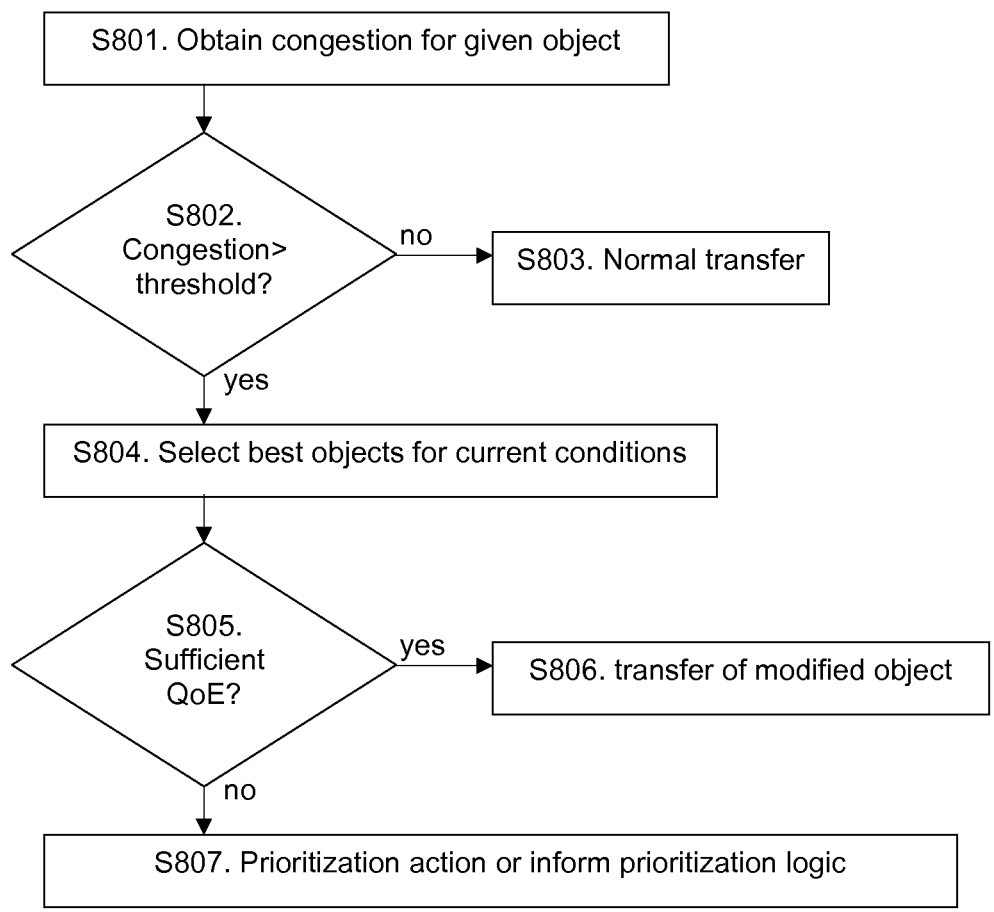
FIG. 8 is a flow diagram showing exemplary steps for determining whether to modify a data object.

An example of object modification logic is shown in FIG. 8. In this example, it is triggered by the congestion severity information such as that transferred in Step S307 in FIG. 3. The following numbering corresponds to that of FIG. 8:

S801. Congestion information is obtained.

S802. If the congestion is not above a predetermined threshold, then the process continues at step S803, otherwise it continues at step S804.

S803. Normal transfer of the data object 7 occurs.

S804. The best data object for the current conditions is selected (for example, a video object may be replaced by an image object, or an advertising object may be replaced by a hyperlink).

S805. A determination is made as to whether this will provide an adequate QoE. If not then the method continues at step S807, otherwise it continues at step S806.

S806. The modified data object 7 is transferred.

S807. Prioritization action is taken or the prioritization logic is informed that the data object 7 must be placed in a prioritized order.

Note that a network operator may offer users the possibility to "subscribe" to compression on a (semi-)permanent basis. One possibility is that operators offer users a special application in which they can choose between several such options. Examples of possible settings in "subscription profiles" include "apply level I of compression for the next t time units"; "apply level I of compression when I am on 2G/3G/4G"; and "apply level I of compression when I am roaming". Such settings could, e.g., be a part of the functionality offered by the Policy Charging and Resource Function (PCRF).

Network operators may also offer content providers (e.g. advertisement agencies) the possibility to "buy themselves out" of such compression.

Re-encoded and reselected data objects 7 may optionally be supplemented by clickable links. This gives users the possibility to explicitly request the original versions of modified data objects 7 by presenting clickable links. For example, a click on an image or video may trigger a (possibly low priority) download of the original data object 7. This idea may be varied in several ways as follows:

Links may be embedded in images and videos or separate as pure text or "buttons".
  Clicks may apply only to the specific image or video in question.
  Clicks may apply to groups of images or videos (e.g., all images, all videos or all objects in the page).
  Clicks may result in stepwise richer content (e.g., clickable low-resolution images may be replaced by clickable medium-resolution images and clickable medium-resolution images may be replaced by high-resolution images etc.).
  Clicks may present users with several options (move to low, medium or high resolution) which may come at different priorities and/or price tags.
  Clicks may result in different speeds (low priority and possibly lower cost) or users may be able to choose priority/cost in a subscription profile or by click.

Note that the exemplary list above, as well as other variants and combinations, may also be included in user profiles depending on subscription type.

A further (supplementary) option is to trigger updates automatically if, for example, congestion drops and/or users spend enough time on the web page in question. Voluntary activation of such a mechanism may also be a part of the user subscription profile and it may be that "delayed bits" are charged at lower rates.

Figure 9:
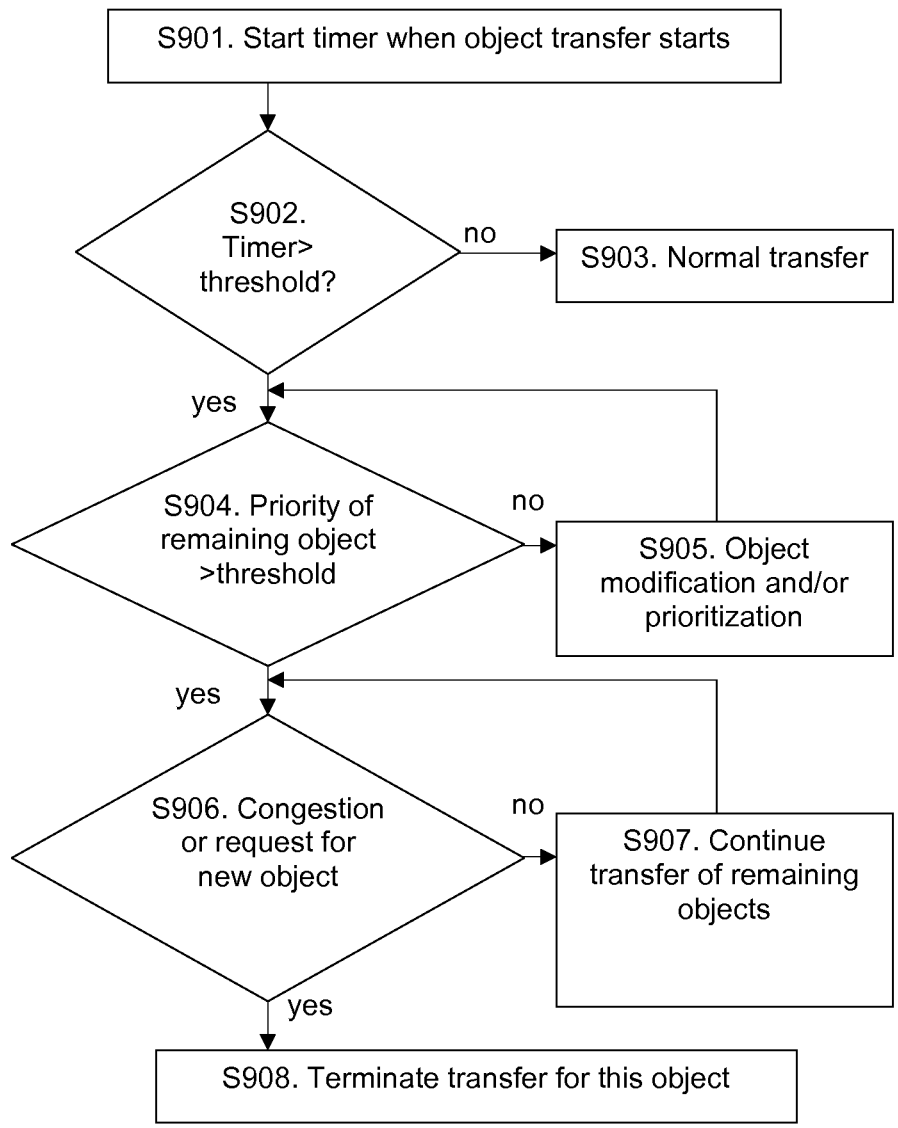
FIG. 9 is a flow diagram showing exemplary steps in determining degradation of data object transfer.

In case of extreme loads due to, for example, sudden traffic peaks and handovers to heavily loaded cells, it may be necessary to reduce the number of transferred data objects 7 to obtain acceptable response times. This may be thought of as a natural extension of prioritization between the data objects 7 in that only the most important data objects 7 will be transferred. If the instant bandwidth is not sufficient to fit the expected download time then only a reduced set of data objects 7 can be transferred and the rest are terminated or scheduled for later download if the web page is still valid. Care should be taken to terminate only those data objects 7 that would not impede proper rendering and viewing of the web page. This can, at least partly, be ensured by following assigning a priority threshold and determining whether a data object 7 has the required priority. An exemplary process is shown in FIG. 9, with the following numbering corresponding to that of the FIG. 9.

S901. When the data object 7 transfer starts, a timer is started.

S902-S903. If the timer is below a predetermined threshold then normal transfer takes place.

S904-S905. If the priority of a remaining data object 7 is below a predetermined priority threshold then data object 7 modification or prioritization takes place.

S906-S908. If no congestion or user request for new data objects 7 is detected then the transfer of remaining content continues, otherwise transfer of the data object 7 is terminated.

Note that users may "subscribe" to such compression in the same way as suggested above and, similarly, network operators may offer content providers the possibility to buy themselves out of such compression. Note that the idea of added links can be applied so that removed data objects 7 are replaced by clickable links.

It may happen that RAN 6 conditions (load and interference in the cell, signal strength for the client device 1 etc.) and/or web pages (size etc.) do not permit the required QoE (in terms of, e.g., transfer time). In this case, the TOE 5 may order temporal re-prioritization of corresponding bearers based on feedback about the current data object 7 transfer status such as remaining volumes, estimated remaining time, priority of the remaining data objects 7 etc.

Figure 10:
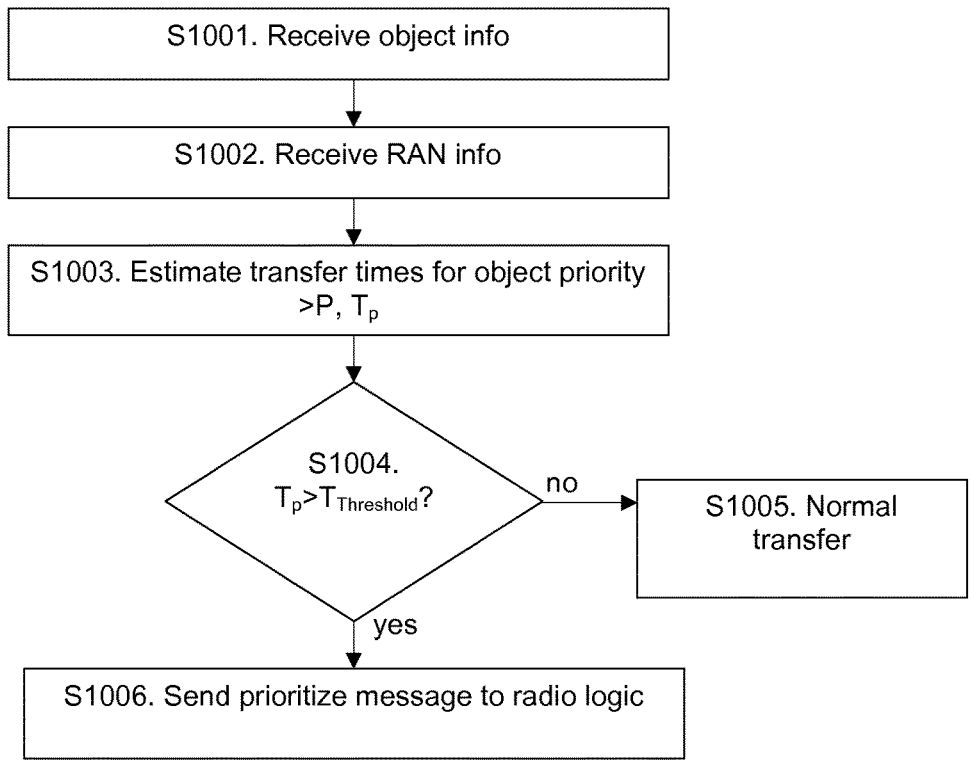
FIG. 10 is a flow diagram showing exemplary bearer prioritization.

This is illustrated in FIG. 10, in which it can be seen that data object 7 information and information about the RAN 6 are used to estimate transfer times for data objects 7 having a certain priority. If the estimated time does not exceed a time threshold then normal transfer occurs, otherwise a prioritization message is sent to the radio logic 3 for the given bearer.

In a further exemplary embodiment, transport protocol parameters (such as TCP parameters) are dynamically modified according to received and/or derived throughput information. Examples of possible dynamic modifications include more aggressive ramp ups in slow start mechanism such as that used by TCP, and less drastic reduction after time outs.

Figure 11:
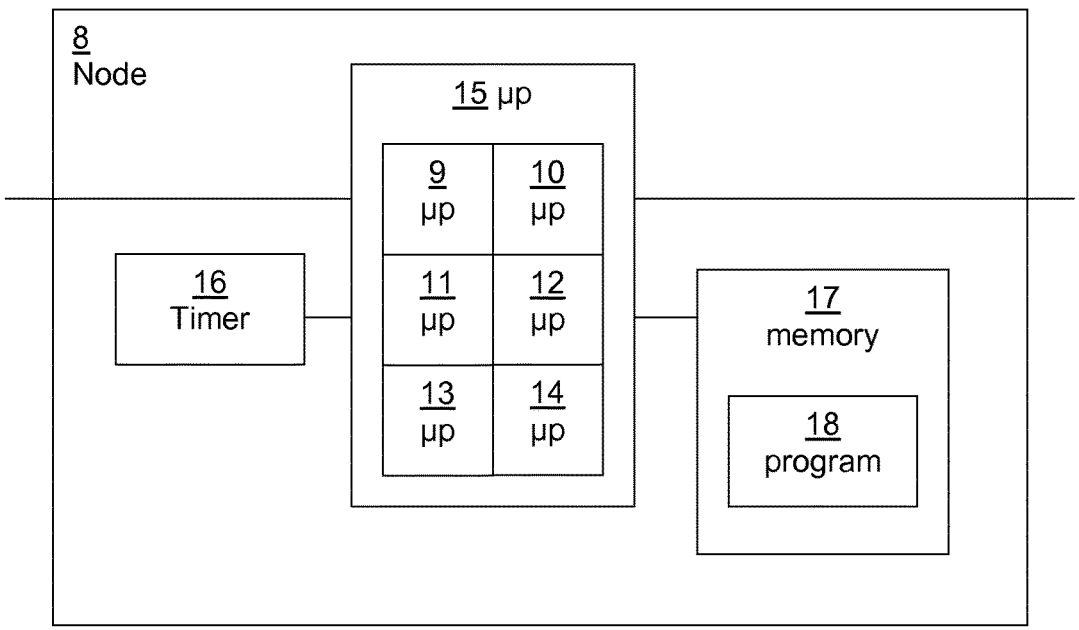
FIG. 11 illustrates schematically in a block diagram an exemplary node.

Turning now to FIG. 11, there is illustrated an exemplary node 8. Note that in practice, this node may be split over different physical nodes. Furthermore, while several processors are shown, they may be implemented as functions in a single processor, or as different physical processors. The node 8 is provided with a first processor 9 for determining a first property such as that of the RAN 6 or a client device 1 instruction. A second processor 10 is provided for determining a property of the data object 7 to be sent from the Content Server 2 to the client device 1 via the RAN 6. A third processor 11 is provided for, in response to the determined first property and the property of the data object 7, amending a characteristic of a transfer of the data object 7 from the Content Server 2 to the client device 1 (either intrusively or non-intrusively as described above. The transfer characteristic may be amending the data object 7 itself or changing an order in which it is to be sent relative to other data objects 7. The third processor 11 is further arranged to arrange the transfer of the data object 7 from the Content Server 2 to the client device 1. A fourth processor 12 may be provided for determining a property of the Content Server 2 and is arranged to, in response to the determined property of the Content Server 2, further amend the characteristic of a transfer of the data object from the Content Server 2 to the client device 1. A fifth processor may be provided 13 for estimating a time to provide the data object 7 to the client device 1, in which case the third processor is further arranged to amend the characteristic of transfer in the event that the estimated time exceeds a predetermined threshold time. A sixth processor 14 may be provided for determining a property of a user subscription associated with the client device 1, in which case the third processor 11 is further arranged to amend the characteristic of transfer in response to the determined property of the user subscription associated with the client device 1. A timer 16 may be provided that records a time from the start of providing the data object 7 to the client device 1, in which case the third processor 11 is arranged to, in the event that the time recorded by the timer exceeds a predetermined threshold, amend a characteristic of a transfer of the data object 7 from the Content Server 2 to the client device 1.

A non-transitory computer readable medium in the form of a memory 17 is provided. This can be used to store a computer program 18 which, when executed by the processor 15, cases the node 8 to behave as described.

Figure 12:
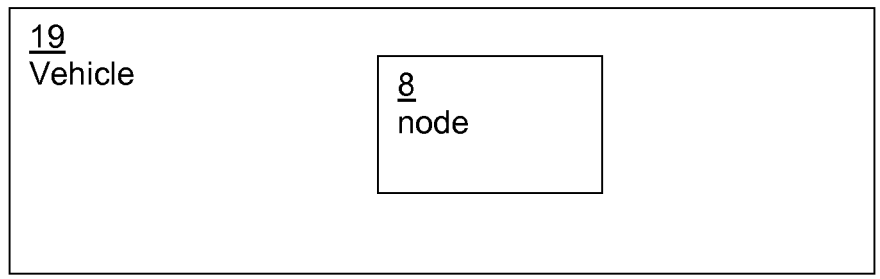
FIG. 12 illustrates schematically in a block diagram an exemplary vessel or vehicle.

Turning now to FIG. 12, there is shown a vessel or vehicle 19 (such as a ship, a train, a car and so on) that incorporates a node 8 as shown in FIG. 11

The techniques described above enable faster and more controllable download of web pages that may be tailored to variable user expectations on QoE and allows for aggregate (cell-level) QoE optimization. They may be applied in combination with existing techniques for web optimization to achieve even better performance It will be appreciated by a person of skill in the art that various modifications may be made to the above described embodiment without departing from the scope of the present disclosure. For example, the functions of the network node are described as being embodied at a single node, but it will be appreciated that different functions may be provided at different network nodes. Furthermore, the description above assumes that the client device 1 is a mobile terminal or smart phone, but it will be appreciated that the same techniques can be used in any type of communications access network that use different types of mobile terminal and communication network.

The following acronyms have been used in the above description:
CQI Channel Quality Indicator
HTML Hypertext Markup Language
HTTP Hypertext Transfer Protocol
HTH HTTP Traffic Handler
MOS Mean Opinion Score
PCRF Policy Charging and Resource Function
QoE Quality of Experience
QoS Quality of Service
RAN Radio Access Network
RLC Radio Link Control
RTT Round Trip Time
SB Shadow Browser
TCP Transmission Control Protocol
TOE Transfer Optimization Engine
UE User Equipment

The invention claimed is:

1. A method in a node for transferring a plurality of data objects associated with an HTTP request to a client device in a communications network, the method comprising:
    receiving, from a content server, the plurality of data objects associated with the HTTP request;
    identifying one or more properties of the plurality of data objects associated with the HTTP request to be delivered to the client;
    obtaining content transfer optimization information based on one or more properties of a radio access network (RAN) and a Content Server, client device instructions, and the one or more properties of the plurality of data objects;
    when the content transfer optimization information indicates that optimization is required for one or more of the plurality of data objects, assigning a priority to each of the plurality of data objects;
    when the properties of the RAN indicate congestion not exceeding a predetermined threshold, transferring the plurality of data objects in order of priority; and
    when the properties of the RAN indicate congestion exceeding a predetermined threshold, modifying one or more of the plurality of data objects by re-encoding the one or more of the plurality of data objects or replacing the one or more of the plurality of data objects with a different data object type, and transfer the modified plurality of data objects in order of priority.

2. The method according to claim 1, wherein the one or more properties of the RAN comprises any of a RAN type, an available power in a RAN cell, a downlink code-tree consumption, a measure of congestion, a Channel Quality Indicator, power consumption of sending per bit or byte over the radio path, bearer priority, and RAN cell load.

3. The method according to claim 1, wherein the one or more properties of the plurality of data objects comprises any of:
    a number of associated data objects in the plurality of data objects;
    size of the one or more data objects of the plurality of data objects;
    a number of sources of the plurality of data objects;
    a data object type of the one or more data objects of the plurality of data sources; and
    a data object priority of the one or more data objects of the plurality of data sources.

4. The method according to claim 1, wherein the one or more properties of the Content Server comprises any of Content Server availability, Content Server response times, and Content Server load.

5. The method according claim 1, further comprising:
    estimating a time to provide the plurality of data objects to the client device; and
    in the event that the estimated time exceeds a predetermined threshold time, further modifying the one or more of the plurality of data objects before transferring to the client device.

6. The method according to claim 1, wherein modifying the one or more of the plurality of data objects further comprises any one of: modifying the priority assigned to one or more of the data objects; deleting at least a portion of content of the data object; and cancelling the transfer of the data object.

7. The method according to claim 1,
    wherein the different data object type comprises any of:
    a data object with a lower resolution version,
    a still-image data type to replace a video-type data object, and
    a data object having an alternative format.

8. The method according to claim 1, further comprising:
    determining any of a property of a user subscription, a subscription policies associated with the client device, and a policy associated with the data object; and in response to the determined property of the user subscription and subscription policies associated with the client device, further modifying the one or more of the plurality of data objects prior to transferring the modified plurality of data objects from the Content Server to the client device.

9. The method according to claim 1, further comprising:
at the start of transferring the data object to the client device, starting a timer;
in the event that the time recorded by the timer exceeds a predetermined threshold, further modifying the one or more of the plurality of data objects prior to transferring the modified plurality of data objects from the Content Server to the client device.

10. The method according to claim 1, when operated on a vessel or vehicle.

11. A non-transitory computer readable medium comprising computer readable code which, when run from the computer readable medium by a processor at a node, causes the node to perform the method as claimed in claim 1.

12. A node for transferring a plurality of data objects associated with an HTTP request to a client device in a communications network, the node comprising:
a processor; and
a memory comprising a computer program which when executed by the processor causes the node to:
receive, from a content server, the plurality of data objects associated with the HTTP request;
identify one or more properties of the plurality of data objects associated with the HTTP request to be delivered to the client;
obtain content transfer optimization information based on one or more properties of a radio access network (RAN) and a Content Server, client device instructions, and the one or more properties of the plurality of data objects;
when the content transfer optimization information indicates that optimization is required for one or more of the plurality of data objects, assign a priority to each of the plurality of data objects;
when the properties of the RAN indicate congestion not exceeding a predetermined threshold, transfer the plurality of data objects in order of priority; and
when the properties of the RAN indicate congestion exceeding a predetermined threshold, modify one or more of the plurality of data objects by re-encoding the one or more of the plurality of data objects or replacing the one or more of the plurality of data objects with a different data object type, and transfer the modified plurality of data objects in order of priority.

13. The node according to claim 12, wherein the computer program, when executed by the processor, further causes the node to:
estimate a time to provide the plurality of data objects to the client device; and
in the event that the estimated time exceeds a predetermined threshold time, further modify the one or more of the plurality of data objects before transferring to the client device.

14. The node according to claim 12, wherein the computer program when executed by the processor, further causes the node to:
determine a property of a user subscription associated with the client device; and
in response to the determined property of the user subscription associated with the client device, further modify the one or more of the plurality of data objects prior to transferring the modified plurality of data objects from the Content Server to the client device.

15. The node according to claim 12, further comprising a timer arranged to record a time from the start of providing the data object to the client device, and
when the time recorded by the timer exceeds a predetermined threshold, the node further modifies the one or more of the plurality of data objects prior to transferring the modified plurality of data objects from the Content Server to the client device.

16. The node according to claim 12, when applied to a vessel or vehicle.

* * * * *